US009889720B2

(12) United States Patent
Tsunoda et al.

(10) Patent No.: US 9,889,720 B2
(45) Date of Patent: Feb. 13, 2018

(54) AIR-CONDITIONING APPARATUS FOR VEHICLE

(71) Applicant: FUJI JUKOGYO KABUSHIKI KAISHA, Tokyo (JP)

(72) Inventors: Takashi Tsunoda, Tokyo (JP); Hisashi Nagano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1 day.

(21) Appl. No.: 15/064,430

(22) Filed: Mar. 8, 2016

(65) Prior Publication Data

US 2016/0288617 A1 Oct. 6, 2016

(30) Foreign Application Priority Data

Mar. 30, 2015 (JP) .................................. 2015-070106

(51) Int. Cl.
*B60H 1/00* (2006.01)
*B60H 1/14* (2006.01)

(52) U.S. Cl.
CPC ......... *B60H 1/00885* (2013.01); *B60H 1/143* (2013.01)

(58) Field of Classification Search
CPC .......................... B60H 1/00885; B60H 1/143; B60H 1/00428; B60H 1/00057; B60H 1/00385; F25B 30/02; F25B 19/02; F25B 7/00; F25B 43/00
USPC ............................................... 165/202, 240
See application file for complete search history.

(56) References Cited

U.S. PATENT DOCUMENTS

| 6,604,576 | B2 * | 8/2003 | Noda | B60H 1/00878 165/202 |
| 7,028,767 | B2 * | 4/2006 | Takano | B60H 1/00914 165/202 |
| 7,231,776 | B2 * | 6/2007 | Casar | B60H 1/00899 165/41 |
| 2014/0218858 | A1 * | 8/2014 | Shelnutt | G06F 1/206 361/679.31 |

FOREIGN PATENT DOCUMENTS

| JP | 64-015467 A | 1/1989 |
| JP | 05-278451 A | 10/1993 |
| JP | 06-156048 | 6/1994 |
| JP | 10-181331 A | 7/1998 |
| JP | 2008-080850 A | 4/2008 |
| JP | 2014-156143 A | 8/2014 |

OTHER PUBLICATIONS

Office Action received for Japanese Patent application No. 2015-070106, dated Aug. 23, 2016, 6 pages of office action including 4 pages of English translation.

* cited by examiner

*Primary Examiner* — Davis Hwu
(74) *Attorney, Agent, or Firm* — Chip Law Group (57) ABSTRACT

An air-conditioning apparatus for a vehicle includes an air-conditioning duct that includes an air supply path through which air to be supplied into an interior of the vehicle passes, a first tank to which a cool medium and a warm medium for adjusting the temperature of a first intermediate medium are supplied, a first heat exchanger that is provided in the air-conditioning duct and through which the first intermediate medium circulates from the first tank, and a controller that controls the first intermediate medium to a temperature needed to set the interior to a desired temperature.

4 Claims, 6 Drawing Sheets

AIR-CONDITIONING APPARATUS FOR VEHICLE

CROSS-REFERENCE TO RELATED APPLICATIONS

The present application claims priority from Japanese Patent Application No. 2015-070106 filed on Mar. 30, 2015, the entire contents of which are hereby incorporated by reference.

BACKGROUND

1. Technical Field

The present invention relates to an air-conditioning apparatus for a vehicle that is installed in a vehicle such as an automobile.

2. Related Art

Japanese Unexamined Patent Application Publication No. 2008-080850 discloses an air-conditioning apparatus for a vehicle that includes an air-conditioning duct through which the air to be supplied to the interior of the vehicle passes, and a heater and an evaporator that are provided in the air-conditioning duct.

In such a conventional air-conditioning apparatus for a vehicle, the air in the air-conditioning duct is pressure-fed by a blower fan provided at an intake port, and thereby flows through the duct. When the motive power source of the vehicle is in operation, the heater serves as a warm heat exchanger and the evaporator serves as a cool heat exchanger. The air flowing through the air-conditioning duct is cooled by the evaporator and heated by the heater, and is blown out from a blowout port to the interior. The temperature and humidity of the interior can be adjusted in a situation where the motive power source of the vehicle is in operation.

However, in such a conventional air-conditioning apparatus for a vehicle, it is necessary to mix the air heated by the heater and other air, such as the air simply cooled by the evaporator, in the air-conditioning duct to equalize the temperature, etc. of the air to be blown out to some extent, for example. The air-conditioning duct has to be provided with, downstream of the heater, a passage with a long enough length to mix the airs. Consequently, the air-conditioning duct is increased in size.

Thus, for the air-conditioning apparatus for a vehicle, it is required to suppress the size increase of the air-conditioning duct so that the occupied volume thereof in the space of the interior is kept at a low level even when the air-conditioning duct is installed in the interior of the vehicle.

SUMMARY OF THE INVENTION

According to the present invention, an air-conditioning apparatus for a vehicle includes: an air-conditioning duct that includes an air supply path through which an air to be supplied to an interior of the vehicle passes; a first tank that stores a first intermediate medium and to which a cool medium and a warm medium for adjusting a temperature of the first intermediate medium are supplied; a first heat exchanger that is provided in the air-conditioning duct and through which the first intermediate medium circulates from the first tank; and a controller that controls the first intermediate medium to a temperature enough to set the interior to a desired temperature.

The air-conditioning apparatus for a vehicle may further include: a second tank that stores a second intermediate medium and to which a cool medium and a warm medium for adjusting a temperature of the second intermediate medium are supplied; and a second heat exchanger that is provided in the air-conditioning duct upstream of the first heat exchanger and through which the second intermediate medium circulates from the second tank. The controller may control the second intermediate medium to a dehumidification temperature.

The air-conditioning duct may include an upper blowout path that blows out an air toward an upper portion or a glass surface of the interior, and a lower blowout path that is provided below the upper blowout path and blows out an air toward a lower portion of the interior. The first heat exchanger may be provided in the air supply path, where the first intermediate medium flows from bottom toward top. The second heat exchanger may be provided in the air supply path, where the second intermediate medium flows from top toward bottom.

The air-conditioning apparatus for a vehicle may further include: a third heat exchanger that is juxtaposed below the first heat exchanger in the air supply path of the air-conditioning duct and through which the first intermediate medium circulates from the first tank. The controller may pass the first intermediate medium in a larger amount through the third heat exchanger than through the first heat exchanger.

The air-conditioning apparatus for a vehicle may further include: a fourth heat exchanger that is juxtaposed below the second heat exchanger in the air supply path of the air-conditioning duct and through which the second intermediate medium circulates from the second tank. The controller may pass the second intermediate medium in a larger amount through the second heat exchanger than through the fourth heat exchanger.

The air-conditioning apparatus for a vehicle may further include: a second tank that stores a second intermediate medium and to which a cool medium and a warm medium for adjusting a temperature of the second intermediate medium are supplied; and a second heat exchanger that is provided in the air-conditioning duct downstream of the first heat exchanger and through which the second intermediate medium circulates from the second tank. The controller may control the second intermediate medium to a dehumidification temperature.

The air-conditioning apparatus for a vehicle may further include: an interior circulation path that allows the first intermediate medium to circulate between the first tank and the interior of the vehicle.

DETAILED DESCRIPTION

Hereinafter, preferred implementations of the present disclosure will be described in detail with reference to the appended drawings. Note that, in this specification and the appended drawings, structural elements that have substantially the same function and structure are denoted with the same reference numerals, and repeated description of these structural elements is omitted.

[First Implementation]

Figure 1:
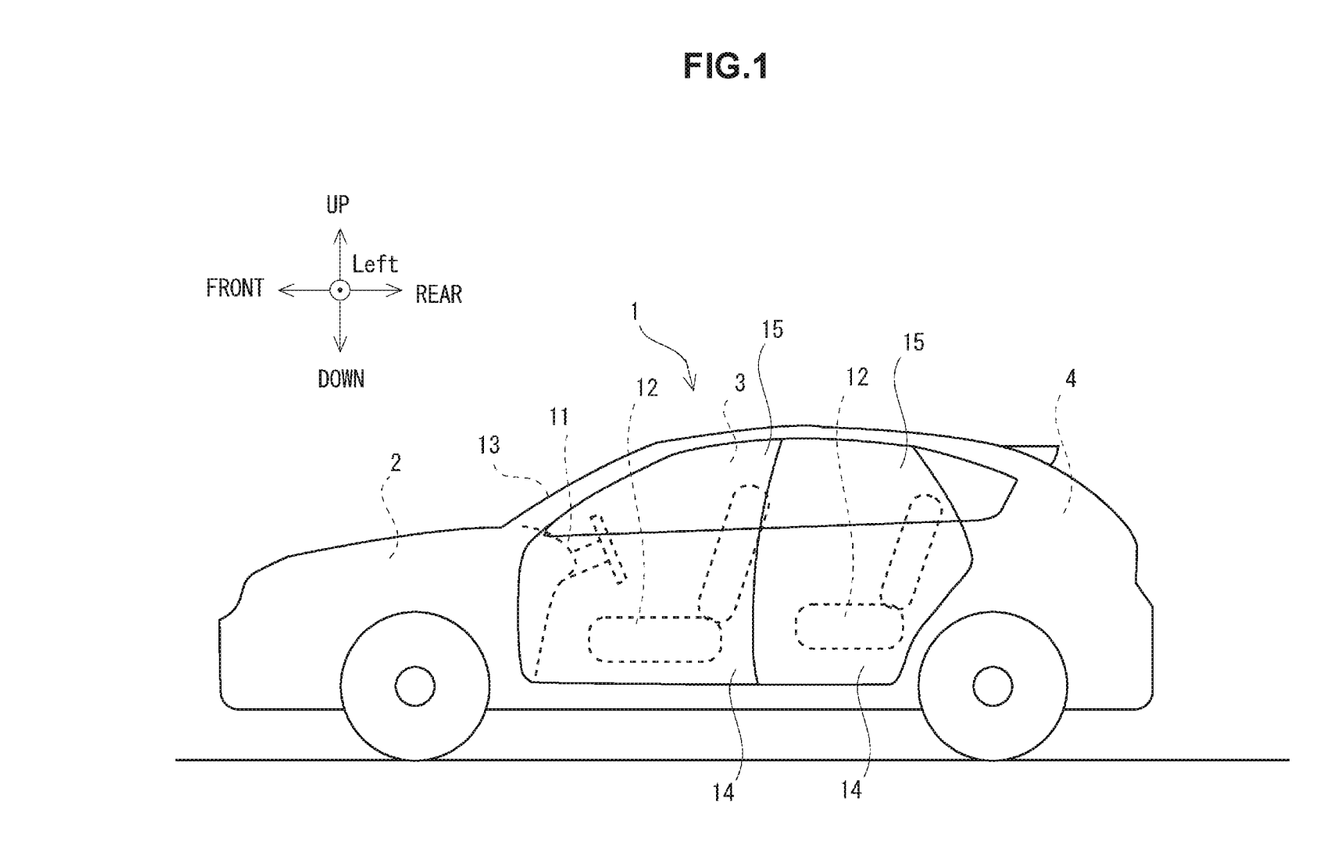
FIG. 1 is a side view illustrating an automobile equipped with an air-conditioning apparatus for a vehicle.

FIG. 1 is a side view illustrating an automobile 1 equipped with an air-conditioning apparatus for a vehicle. The automobile 1 is an example of the vehicle.

The automobile 1 of FIG. 1 includes a car body. The car body is partitioned into a front room 2, a passenger room 3, and a rear room 4 from the front side.

A motive power source, such as an engine or a motor, is disposed in the front room 2 that is a front portion of the car body.

The rear room 4 is used as a trunk.

The driver of the automobile 1, etc. get in the passenger room 3. A dashboard 11, a handle, and a plurality of seats 12 are disposed in the passenger room 3, for example. The plurality of seats 12 are disposed in two rows one behind the other on the floor surface of the passenger room 3. The dashboard 11 is disposed in a front portion of the passenger room 3. A windshield 13 is located above the dashboard 11. A plurality of door panels 14 are attached openably and closably to the left and right sides of the seats 12 disposed in two rows one behind the other. A side glass 15 is disposed in an upper portion of the door panel 14. A rear glass is located above the seat 12 on the rear side. Thus, a plurality of glasses are disposed in an upper portion of the passenger room 3. The driver can look out over the surroundings of the automobile 1 from the passenger room 3. The lower portion of the passenger room 3 is surrounded by the car body and the plurality of door panels 14.

Figure 2:
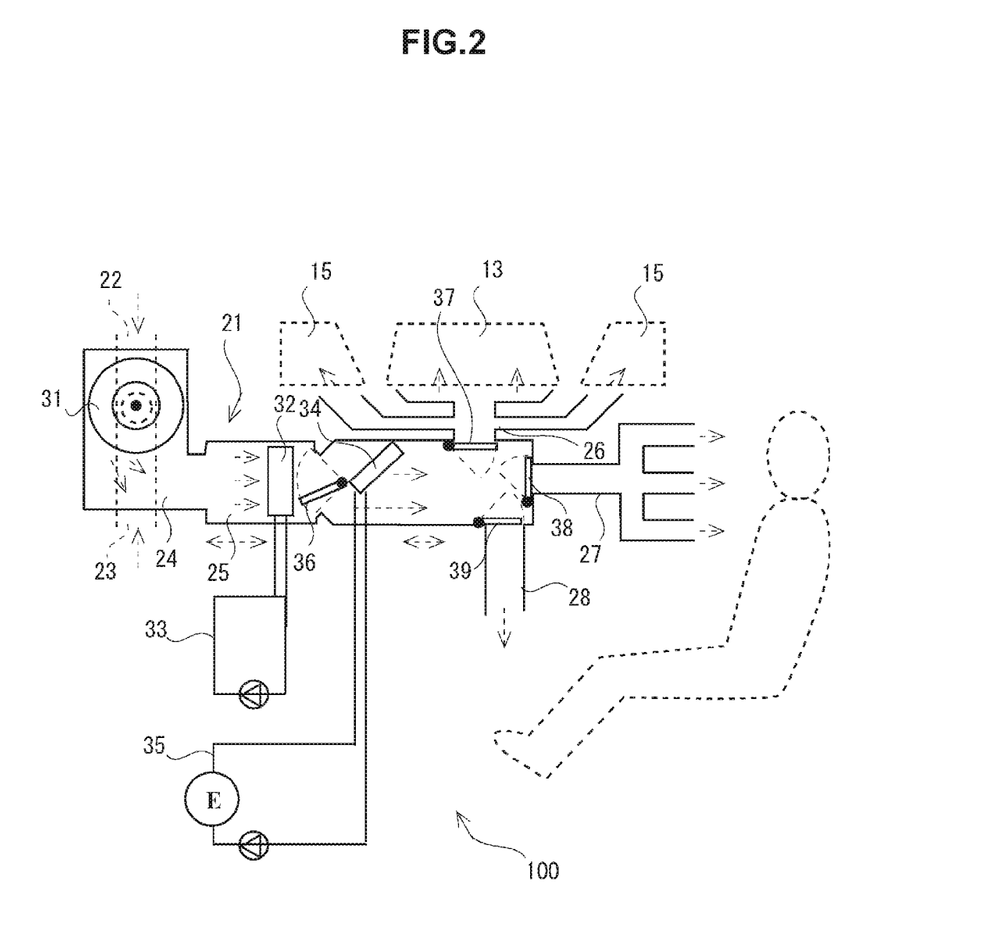
FIG. 2 is a schematic rough configuration diagram of a common air-conditioning apparatus for a vehicle that is installed in the vehicle.

FIG. 2 is a schematic rough configuration diagram of a common air-conditioning apparatus 100 for a vehicle that is installed in the automobile 1.

The common air-conditioning apparatus 100 for a vehicle adjusts the temperature of the passenger room 3.

The common air-conditioning apparatus 100 for a vehicle of FIG. 2 includes an air-conditioning duct 21, a blower fan 31, an evaporator 32, a cool medium circulation apparatus 33, a heater 34, a warm medium circulation apparatus 35, a switching plate 36, a first opening and closing plate 37, a second opening and closing plate 38, and a third opening and closing plate 39, for example.

The air-conditioning duct 21 is formed of a resin material in a hollow structure. The air-conditioning duct 21 includes a plurality of suction paths that suck in air, an installation space 24 of the blower fan 31, an air supply path 25 through which air passes, and a plurality of blowout paths that blow out air. The plurality of suction paths, the installation space 24 of the blower fan 31, the air supply path 25, and the plurality of blowout paths communicate in order in the air-conditioning duct 21. The air-conditioning duct 21 is generally disposed to be housed in the dashboard 11 of the passenger room 3.

The plurality of suction paths include an outer suction path 22 for sucking in air outside the passenger room 3 and an inner suction path 23 for sucking in air in the passenger room 3, for example. The outer suction path 22 opens to the front room 2, for example. In this case, the outer suction path 22 is drawn from the front room 2 to the passenger room 3. The inner suction path 23 opens to the lower surface of the dashboard 11 of the passenger room 3, for example.

The plurality of blowout paths include a blowout path for the glass 26 that blows out air toward the windshield 13 and the side glass 15, a blowout path for the upper body 27 that blows out air toward the upper body of the passenger, and a blowout path for the foot 28 that blows out air toward the foot of the passenger, for example. The blowout path for the glass 26 has three blowout ports for the glass that blow out air toward the windshield 13 and the left and right side glasses 15, for example. The blowout port for the glass is formed on the upper surface of the dashboard 11, for example, and blows out air upward. The blowout path for the upper body 27 has three blowout ports for the upper body, for example. The three blowout ports for the upper body are formed side by side in the left and right direction on the rear surface of the dashboard 11, for example, and blow out air rearward. The blowout path for the foot 28 has a plurality of blowout ports for the foot, for example. The plurality of blowout ports for the foot are formed on the lower surface of the dashboard 11 or under the seat 12, for example, and blow out air rearward. In this case, the blowout path for the glass 26 and the blowout path for the upper body 27 are upper blowout paths that blow out air to the upper portion of the passenger room 3, and the blowout path for the foot 28 is a lower blowout path that blows out air to the lower portion of the passenger room 3.

The blower fan 31 includes a sirocco fan, for example. The blower fan 31 takes in air into the air supply path 25 of the air-conditioning duct 21, and blows out the taken-in air from the air supply path 25 to the passenger room 3; and thereby generates a flow of air in the air-conditioning duct 21. In the case of the installation space 24 of FIG. 2, the blower fan 31 sucks in air from the outer suction path 22 or the inner suction path 23 on the drawing sheet, and sends air in the downward direction of the drawing sheet. The flow of air in the downward direction on the drawing sheet flows into the air supply path 25. Thereby, a flow of air travelling from left to right is generated in the air supply path 25 extending in the left and right direction of the drawing sheet.

The evaporator 32 takes away the heat of the surroundings by evaporation of a liquefied cool medium. The evaporator 32 is disposed in a position relatively near to the installation space 24 of the blower fan 31 in the air supply path 25. The evaporator 32 is disposed so as to close the air supply path 25 entirely.

The cool medium circulation apparatus 33 supplies a liquefied cool medium to the evaporator 32, and collects the cool medium evaporated by the evaporator 32. The cool medium circulation apparatus 33 is an apparatus in which a compressor, a condenser, a receiver, and an evaporation valve are connected circularly by a tube, for example. In the circulation path, a liquid-form cool medium circulates by the compressor being in operation. The evaporator 32 is connected between the evaporation valve and an opening and closing valve by a branched tube. The cool medium evaporated by the evaporation valve is supplied to the evaporator 32.

Thus, the air in the air supply path 25 is cooled by the evaporator 32. The cooling performance by the heat exchange in the evaporator 32 can be adjusted by the amount of the cool medium circulated through the evaporator 32, that is, by the operation of the compressor.

The heater 34 provides heat to the surroundings by a heated warm medium. The heater 34 is disposed between the evaporator 32 and the plurality of blowout paths in the air supply path 25. The heater 34 is disposed so as to close part of the air supply path 25. In general, the heater 34 is disposed so as to close the upper half of the air supply path 25.

The warm medium circulation apparatus 35 supplies a warm medium warmed by the motive power source of the automobile 1 to the heater 34, and collects the warm medium that has circulated through the heater 34. The warm medium circulation apparatus 35 is an apparatus in which a cooling path of an engine, a radiator, a pump, and the heater 34 are connected circularly by a tube, for example. In the circulation path, a liquid-form warm medium circulates by the pump being in operation. When the engine has become warm due to the heat of combustion, the temperature of the warm medium is increased. The heated warm medium flows through the heater 34.

Thus, the air in the air supply path 25 is heated by the heater 34. The heating performance by the heat exchange in the heater 34 can be adjusted by the amount of the warm medium circulated through the heater 34, that is, by the operation of the pump.

The switching plate 36 is disposed between the evaporator 32 and the heater 34 in the air supply path 25. The switching plate 36 is disposed in a vertically movable manner in the air supply path 25. The switching plate 36 closes an upper portion of the air supply path 25, or closes a lower portion of the air supply path 25. Thereby, the amount of supply of air flowing through the air supply path 25 to the heater 34 can be adjusted.

The first opening and closing plate 37 and the second opening and closing plate 38 are disposed in the communication portions with the plurality of blowout paths in the air supply path 25.

The first opening and closing plate 37 is disposed in the communication portion with the blowout path for the glass 26. The communication port with the blowout path for the glass 26 can be closed by the first opening and closing plate 37. In this case, air does not blow out from the blowout path for the glass 26.

The second opening and closing plate 38 is disposed in the communication portion with the blowout path for the upper body 27. The communication port with the blowout path for the upper body 27 can be closed by the second opening and closing plate 38. In this case, air does not blow out from the blowout path for the upper body 27.

The third opening and closing plate 39 is disposed in the communication portion with the blowout path for the foot 28. The communication port with the blowout path for the foot 28 can be closed by the third opening and closing plate 39. In this case, air does not blow out from the blowout path for the foot 28.

In the common air-conditioning apparatus 100 for a vehicle thus configured, by the blower fan 31 being in operation, air is taken in from any of the suction paths, and the air is compressed and pushed out from the blower fan 31 to the air supply path 25. The air in the air supply path 25 passes through the evaporator 32 and the heater 34, and is blown out from the plurality of blowout paths into the passenger room 3.

In a situation where the warm medium circulates through the heater 34, the switching plate 36 closes the lower portion of the air supply path 25, and thereby most of the air flowing through the air supply path 25 is heated by the heater 34. The temperature of the air blown out into the passenger room 3 is increased.

Furthermore, by the circulation of the cool medium through the evaporator 32, most of the air flowing through the air supply path 25 is cooled by the evaporator 32. The temperature of the air blown out into the passenger room 3 is decreased.

Thus, the common air-conditioning apparatus 100 for a vehicle can adjust the temperature of the passenger room 3.

However, in the common air-conditioning apparatus 100 for a vehicle thus configured, the heater 34 is provided in the upper half of the interior of the air supply path 25. Below the heater 34, there is a portion where the heater 34 is not disposed. Downstream of the heater 34, the air heated by the heater 34 and other air, such as the air simply cooled by the evaporator 32, can flow. Hence, it is necessary to mix these airs in the air supply path 25 to equalize the temperature, etc. of the air to be blown out to some extent. The air supply path 25 of the air-conditioning duct 21 has to be formed to be a passage with a long enough length to mix these airs downstream of the heater 34. Consequently, the air-conditioning duct 21 is increased in size. The occupied volume of the air-conditioning duct 21 in the passenger room 3 is increased.

Thus, in the implementation, the size increase of the air-conditioning duct 21 is suppressed. Thereby, even when the air-conditioning duct 21 is installed in the passenger room 3 of the automobile 1, the occupied volume of the air-conditioning duct 21 in the passenger room 3 is kept at a low level.

A detailed description will now be given.

Figure 3:
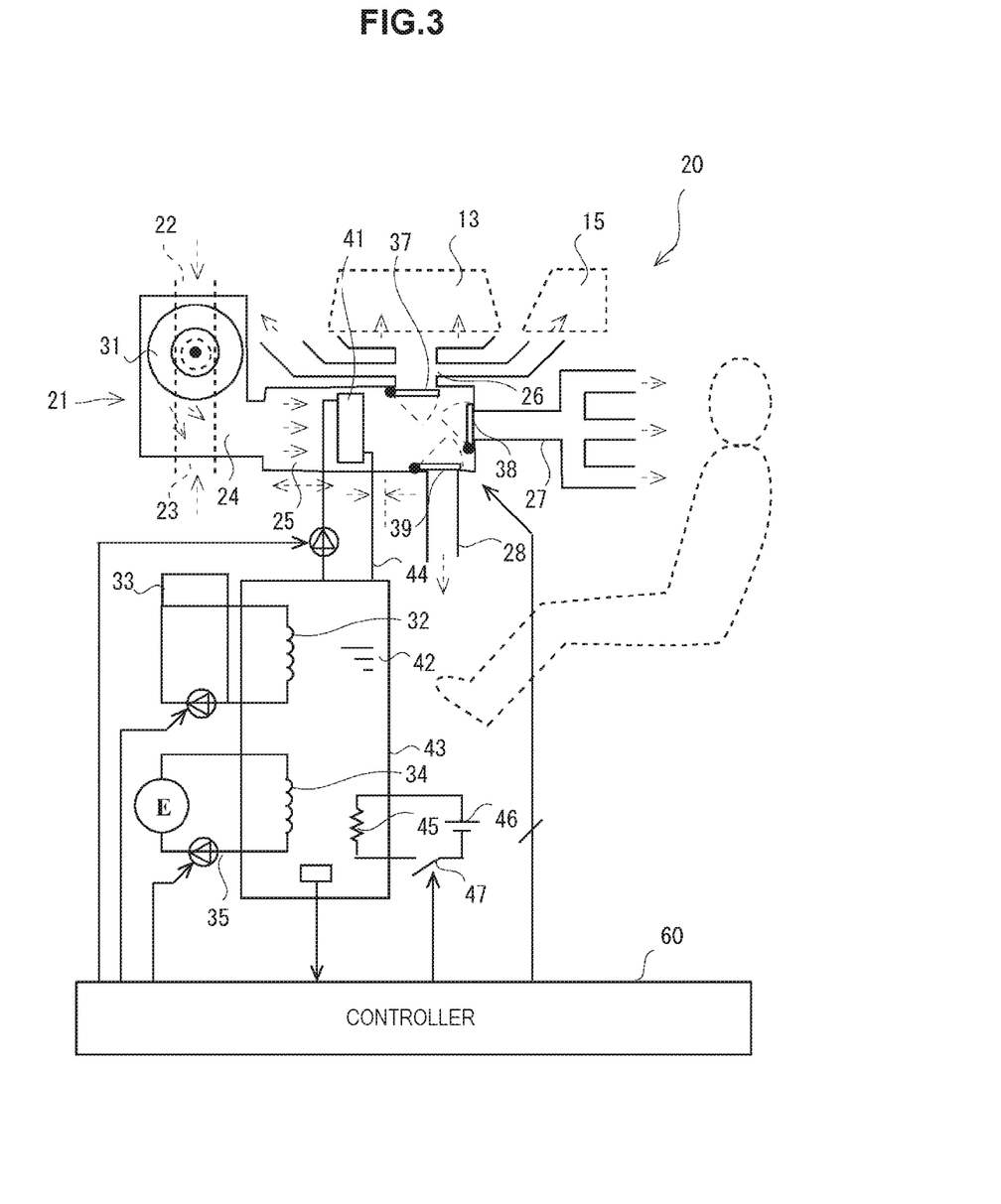
FIG. 3 is a schematic rough configuration diagram of an air-conditioning apparatus for a vehicle according to a first implementation of the present invention.

FIG. 3 is a rough configuration diagram of an air-conditioning apparatus 20 for a vehicle according to a first implementation of the present invention.

In the air-conditioning apparatus 20 for a vehicle of the implementation, the air-conditioning duct 21 includes the outer suction path 22, the inner suction path 23, the installation space 24 of the blower fan 31, the air supply path 25, the blowout path for the glass 26, the blowout path for the upper body 27, and the blowout path for the foot 28. The blower fan 31, a first heat exchanger 41, the first opening and closing plate 37, the second opening and closing plate 38, and the third opening and closing plate 39 are disposed in the air-conditioning duct 21.

The air-conditioning apparatus 20 for a vehicle of the implementation further includes a first heat-insulating tank 43 that stores a first intermediate medium 42, a first circulation path 44, the evaporator 32, the cool medium circulation apparatus 33, the heater 34, the warm medium circulation apparatus 35, an electric heater 45, and a controller 60.

The first heat-insulating tank 43 serves as a first tank of the appended claims in the present implementation.

The first heat-insulating tank 43 has a closed internal space that stores the first intermediate medium 42. The first heat-insulating tank 43 is formed in a heat-insulating structure that maintains the temperature of the first intermediate medium 42. The first heat-insulating tank 43 is disposed in the front room 2 of the automobile 1, for example.

The first intermediate medium 42 is a heat medium. The first intermediate medium 42 may be a coolant liquid, for example.

The evaporator 32, the heater 34, and the electric heater 45 are disposed in the first heat-insulating tank 43.

The cool medium circulation apparatus 33 is connected with the evaporator 32, and supplies a cool medium to the evaporator 32. The cool medium circulation apparatus 33 circulates the cool medium and supplies the cool medium to the evaporator 32, for example by the driving of the compressor.

The warm medium circulation apparatus 35 is connected with the heater 34, and supplies a warm medium to the heater 34. The warm medium circulation apparatus 35 circulates the warm medium warmed by the heat generation of the motive power source and supplies the warm medium to the heater 34, for example by the driving of the pump.

The electric heater 45 forms a closed loop along with a battery 46 and a switch 47, for example. By the switch 47 being closed, the electric heater 45 is electrically energized to generate heat.

The first intermediate medium 42 in the first heat-insulating tank 43 can be cooled by the heat exchange with the cool medium of the evaporator 32. Furthermore, the first intermediate medium 42 in the first heat-insulating tank 43 is warmed by the heat exchange with the warm medium of the heater 34 or by the heat generation of the electric heater 45.

The first heat exchanger 41 is disposed in the air supply path 25 so as to close the air supply path 25 entirely. The first heat exchanger 41 may be formed in a structure of a heat exchanger similar to the heater 34, for example.

The first circulation path 44 connects the first heat-insulating tank 43 and the first heat exchanger 41.

Thereby, the first intermediate medium 42 can circulate between the first heat-insulating tank 43 and the first heat exchanger 41 through the first circulation path 44. The first intermediate medium 42 in the first heat-insulating tank 43 is supplied to the first heat exchanger 41 through the first circulation path 44. In the first heat exchanger 41, heat exchange is performed between the air in the air-conditioning duct 21 and the first intermediate medium 42. The air in the air-conditioning duct 21 is cooled or warmed by the first intermediate medium 42. The first intermediate medium 42 after heat exchange is returned to the first heat-insulating tank 43 through the first circulation path 44. After that, the first intermediate medium 42 is re-heated or re-cooled by the evaporator 32, the heater 34, and the electric heater 45.

The controller 60 controls the operation of the air-conditioning apparatus 20 for a vehicle in order to air-condition the passenger room 3.

The controller 60 controls the flow of air in the air-conditioning duct 21, controls the supply of the cool medium and the warm medium to the first heat-insulating tank 43, controls the electrical energization of the electric heater 45 in the first heat-insulating tank 43, and controls the supply of the first intermediate medium 42 from the first heat-insulating tank 43 to the first heat exchanger 41.

When, for example, the temperature of the passenger room 3 is low, the controller 60 supplies the warm medium to the first heat-insulating tank 43. When the motive power source of the automobile 1 is in shutdown or is not warm, the electric heater 45 is electrically energized. Thereby, the first intermediate medium 42 in the first heat-insulating tank 43 is warmed. The controller 60 circulates the warmed first intermediate medium 42 between the first heat-insulating tank 43 and the first heat exchanger 41. In the first heat exchanger 41, heat exchange is performed between the warmed first intermediate medium 42 and the air in the passenger room 3; and the warmed air is blown out to the passenger room 3. Consequently, the passenger room 3 is warmed.

In the heating operation, the controller 60 may control the first intermediate medium 42 to a temperature enough to set the interior of the passenger room 3 to a desired temperature. For example, when the difference between the current temperature of the passenger room 3 and the target temperature of the passenger room 3 is large, the controller 60 may put the heater 34 and the electric heater 45 into operation to control the first intermediate medium 42 to a temperature higher than the target temperature of the passenger room 3, and then control the first intermediate medium 42 to the target temperature of the passenger room 3. By controlling the first intermediate medium 42 to at least not less than the target temperature of the passenger room 3, the air blown out to the passenger room 3 can be set to the target temperature of the passenger room 3. In order to decrease an excessively increased temperature of the first intermediate medium 42, the cool medium may be supplied to the first heat-insulating tank 43. By controlling the first intermediate medium 42 to the target temperature of the passenger room 3, the temperature of the passenger room 3 can be controlled to the target temperature.

Other than this, when, for example, the temperature of the passenger room 3 is high, the controller 60 supplies the cool medium to the first heat-insulating tank 43. Thereby, the first intermediate medium 42 in the first heat-insulating tank 43 is cooled. The controller 60 circulates the cooled first intermediate medium 42 between the first heat-insulating tank 43 and the first heat exchanger 41. In the first heat exchanger 41, heat exchange is performed between the cooled first intermediate medium 42 and the air in the passenger room 3; and the cooled air is blown out to the passenger room 3. Consequently, the passenger room 3 is cooled.

In the cooling operation, the controller 60 may control the first intermediate medium 42 to a temperature enough to set the interior of the passenger room 3 to a desired temperature. For example, when the difference between the current temperature of the passenger room 3 and the target temperature of the passenger room 3 is large, the controller 60 may put the evaporator 32 into operation to control the first intermediate medium 42 to a temperature lower than the target temperature of the passenger room 3, and then control the first intermediate medium 42 to the target temperature of the passenger room 3. By controlling the first intermediate medium 42 to at least not more than the target temperature of the passenger room 3, the air blown out to the passenger room 3 can be set to the target temperature of the passenger room 3. In order to increase an excessively decreased temperature of the first intermediate medium 42, the warm medium may be supplied to the first heat-insulating tank 43. By controlling the first intermediate medium 42 to the target temperature of the passenger room 3, the temperature of the passenger room 3 can be controlled to the target temperature.

Specifically, the controller 60 may control the temperature of the first intermediate medium 42 to a target temperature in a range from 10 degrees to 30 degrees, which are desired temperatures in the passenger room 3, for example. Thereby, the temperature of the air that exchanges heat with the first intermediate medium 42 is controlled to the target temperature.

Thus, in the implementation, the first intermediate medium 42 is supplied to the first heat exchanger 41 provided in the air-conditioning duct 21 after being controlled to a temperature enough to set the interior of the passenger room 3 of the vehicle to a desired temperature. Hence, the interior of the passenger room 3 of the automobile 1 can be adjusted to be increased or decreased to a desired temperature using only the first heat exchanger 41.

In addition, in the implementation, in the air-conditioning duct 21, only the first heat exchanger 41 is provided in order to set the interior of the passenger room 3 of the vehicle to a desired room temperature. Therefore, there is no need to provide the heater 34 and the evaporator 32 in the air-conditioning duct 21 in order to increase and decrease the room temperature as in the case of the common air-conditioning apparatus 100 for a vehicle. Furthermore, although in the common air-conditioning apparatus 100 for a vehicle it is necessary to ensure, downstream of the heater 34, a passage length to mix the air heated by the heater 34 and the air cooled by the evaporator 32, in the implementation such a passage length is not needed because substantially all the air in the air-conditioning duct 21 can be adjusted to a desired temperature using only the first heat exchanger 41. Consequently, in the implementation, the air supply path 25 is shortened and the air-conditioning duct 21 is downsized. Even when, for example, the air-conditioning duct 21 is installed in the dashboard 11 of the passenger room 3, the space in the passenger room 3 is less likely to be small.

[Second Implementation]

Next, a second implementation of the present invention is described.

Figure 4:
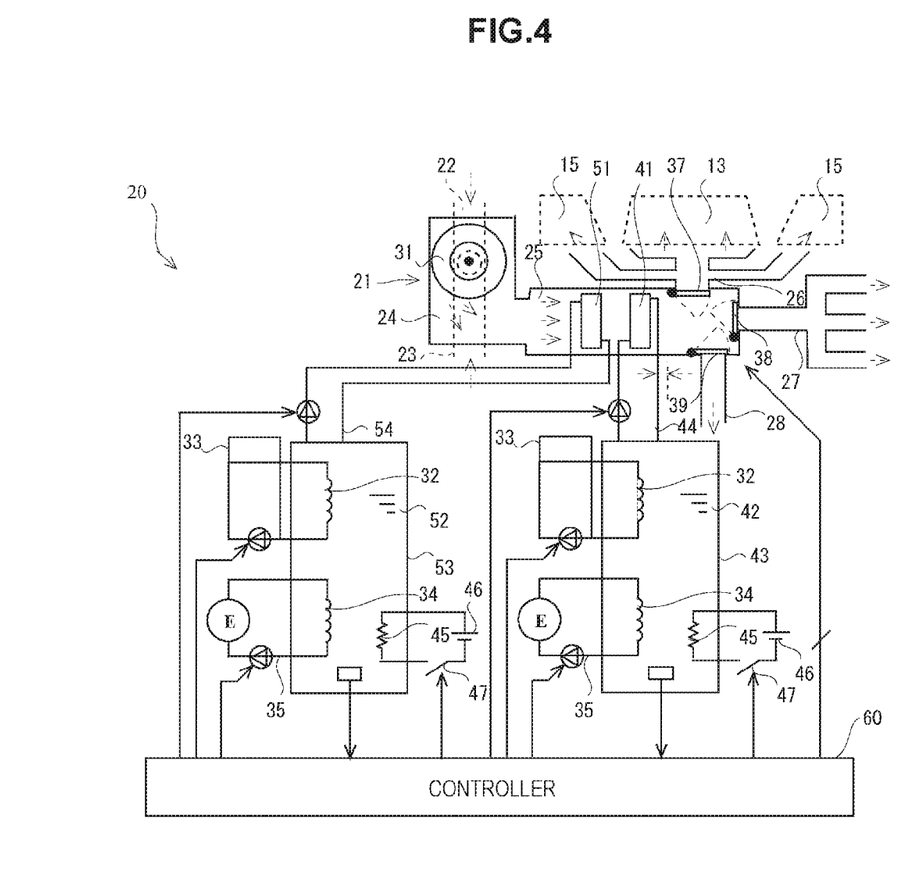
FIG. 4 is a schematic rough configuration diagram of an air-conditioning apparatus for a vehicle according to a second implementation of the present invention.

FIG. 4 is a schematic rough configuration diagram of the air-conditioning apparatus 20 for a vehicle according to the second implementation of the present invention.

The air-conditioning apparatus 20 for a vehicle of FIG. 4 includes the air-conditioning duct 21, the blower fan 31, a second heat exchanger 51, a second heat-insulating tank 53 that stores a second intermediate medium 52, a second circulation path 54, the first heat exchanger 41, the first heat-insulating tank 43 that stores the first intermediate medium 42, and the first circulation path 44.

The second heat-insulating tank 53 serves as a second tank of the appended claims in the present implementation.

The second heat-insulating tank 53 has a similar structure to the first heat-insulating tank 43. For example, the evaporator 32, the heater 34, and the electric heater 45 are provided in the second heat-insulating tank 53. In the drawing, the evaporator 32 of the first heat exchanger 41 and the evaporator 32 of the second heat exchanger 51 are illustrated so as to be connected with different cool medium circulation apparatuses 33. The heater 34 of the first heat exchanger 41 and the heater 34 of the second heat exchanger 51 are illustrated so as to be connected with different warm medium circulation apparatuses 35. The electric heater 45 of the first heat exchanger 41 and the electric heater 45 of the second heat exchanger 51 are illustrated so as to be connected to different batteries 46. These may be shared in the actual automobile 1.

The second intermediate medium 52 is a heat medium. The second intermediate medium 52 may be the same as the first intermediate medium 42, for example.

The second heat exchanger 51 is disposed in the air supply path 25 so as to close the air supply path 25 entirely. The second heat exchanger 51 is located between the installation space 24 of the blower fan 31 and the first heat exchanger 41. The second heat exchanger 51 may be a similar structure to the first heat exchanger 41.

The second circulation path 54 connects the second heat-insulating tank 53 and the second heat exchanger 51.

Thereby, the second intermediate medium 52 can circulate between the second heat-insulating tank 53 and the second heat exchanger 51 through the second circulation path 54. The second intermediate medium 52 in the second heat-insulating tank 53 is supplied to the second heat exchanger 51 through the second circulation path 54. In the second heat exchanger 51, heat exchange is performed between the air in the air-conditioning duct 21 and the second intermediate medium 52. The air in the air-conditioning duct 21 is cooled or warmed by the second intermediate medium 52. The second intermediate medium 52 after heat exchange is returned to the second heat-insulating tank 53 through the second circulation path 54. After that, the second intermediate medium 52 is re-heated or re-cooled by the evaporator 32, the heater 34, and the electric heater 45.

Otherwise, the configuration of the air-conditioning apparatus 20 for a vehicle of FIG. 4 is the same as the air-conditioning apparatus 20 for a vehicle of FIG. 3, and a description thereof is omitted using the same reference numerals.

In the air-conditioning apparatus 20 for a vehicle thus configured, the controller 60 performs control for air-conditioning the passenger room 3.

The controller 60 controls the flow of air in the air-conditioning duct 21, controls the supply of the cool medium and the warm medium to the first heat-insulating tank 43, controls the electrical energization of the electric heater 45 in the first heat-insulating tank 43, and controls the supply of the first intermediate medium 42 from the first heat-insulating tank 43 to the first heat exchanger 41. Furthermore, the controller 60 controls the supply of the cool medium and the warm medium to the second heat-insulating tank 53, controls the electrical energization of the electric heater 45 in the second heat-insulating tank 53, and controls the supply of the second intermediate medium 52 from the second heat-insulating tank 53 to the second heat exchanger 51.

When, for example, the temperature of the passenger room 3 is low, the controller 60 supplies the warm medium to the first heat-insulating tank 43 without putting the second heat-insulating tank 53 into operation. When the motive power source of the automobile 1 is in shutdown or is not warm, the electric heater 45 is electrically energized. Thereby, the first intermediate medium 42 in the first heat-insulating tank 43 is warmed to a temperature enough to set the interior of the passenger room 3 to a desired temperature. The controller 60 circulates the warmed first intermediate medium 42 between the first heat-insulating tank 43 and the first heat exchanger 41. In the first heat exchanger 41, heat exchange is performed between the warmed first intermediate medium 42 and the air in the passenger room 3; and the warmed air is blown out to the passenger room 3. Consequently, the passenger room 3 is warmed.

Other than this, when, for example, the temperature of the passenger room 3 is high, the controller 60 supplies the cool medium to the first heat-insulating tank 43 without putting the second heat-insulating tank 53 into operation. Thereby, the first intermediate medium 42 in the first heat-insulating tank 43 is cooled to a temperature enough to set the interior of the passenger room 3 to a desired temperature. The controller 60 circulates the cooled first intermediate medium 42 between the first heat-insulating tank 43 and the first heat exchanger 41. In the first heat exchanger 41, heat exchange is performed between the cooled first intermediate medium 42 and the air in the passenger room 3; and the cooled air is blown out to the passenger room 3. Consequently, the passenger room 3 is cooled.

Other than these, when, for example, dehumidifying the passenger room 3, the controller 60 puts the second heat-insulating tank 53 into operation while controlling the first intermediate medium 42 of the first heat-insulating tank 43 to a temperature enough to set the interior of the passenger room 3 to a desired temperature. The second intermediate medium 52 of the second heat-insulating tank 53 is controlled by the evaporator 32 of the second heat-insulating tank 53 to a dehumidification temperature at which the second intermediate medium 52 does not freeze, approximately 0 degrees. When the second intermediate medium 52 has become too cool, the heater 34 or the electric heater 45 is put into operation in the second heat-insulating tank 53. The controller 60 circulates the cooled second intermediate medium 52 between the second heat-insulating tank 53 and the second heat exchanger 51. In the second heat exchanger 51, heat exchange is performed between the cooled second intermediate medium 52 and the air in the passenger room 3; and the air is dehumidified. The dehumidified air is warmed to a desired temperature by the first heat exchanger 41, and is then blown out to the passenger room 3. Consequently, the passenger room 3 is dehumidified.

Thus, in the implementation, using the second intermediate medium 52 along with the first intermediate medium 42, the air in the air-conditioning duct 21 can be cooled by the second intermediate medium 52 and then warmed by the first intermediate medium 42. Hence, the interior of the passenger room 3 of the automobile 1 can be increased or decreased to a desired temperature, or can be dehumidified.

In addition, in the implementation, the first heat exchanger 41 and the second heat exchanger 51 are formed substantially wholly in the air supply path 25 of the air-conditioning duct 21. Therefore, there is no need to provide a passage length to mix airs of different temperatures in the rear of the first heat exchanger 41. Consequently, the air supply path 25 can be shortened, and the air-conditioning duct 21 can be downsized.

In the implementation, the second intermediate medium 52 is supplied to the second heat exchanger 51 from an upper portion of the second heat exchanger 51, and is discharged from a lower portion of the second heat exchanger 51. Therefore, the air flowing through the upper portion of the air supply path 25 of the air-conditioning duct 21 is effectively dehumidified by the second intermediate medium 52 at a low temperature, and is then warmed by the first intermediate medium 42 with the temperature decreased. The air that flows through the upper portion of the interior of the air supply path 25 and is blown out toward the upper portion or the glass surface of the interior is effectively dehumidified by the second intermediate medium 52 not warmed by heat exchange.

The first intermediate medium 42 is supplied to the first heat exchanger 41 from a lower portion of the first heat exchanger 41, and is discharged from an upper portion of the first heat exchanger 41. Therefore, the air flowing through the lower portion of the air supply path 25 of the air-conditioning duct 21 is dehumidified by the second intermediate medium 52 with the temperature increased, and is then effectively warmed by the first intermediate medium 42 warmed.

The temperature of the air blown out from the upper portion of the air-conditioning duct 21 can be made lower than the temperature of the air blown out from the lower portion of the air-conditioning duct 21. By providing a temperature difference, the temperature of the air coming into contact with the face, etc. of the passenger can be decreased and an uncomfortable feeling can be suppressed. A temperature difference can be provided between the air blown out toward the upper portion or the glass surface of the interior of the passenger room 3 and the air blown out toward the lower portion of the interior of the passenger room 3.

[Third Implementation]

Figure 5:
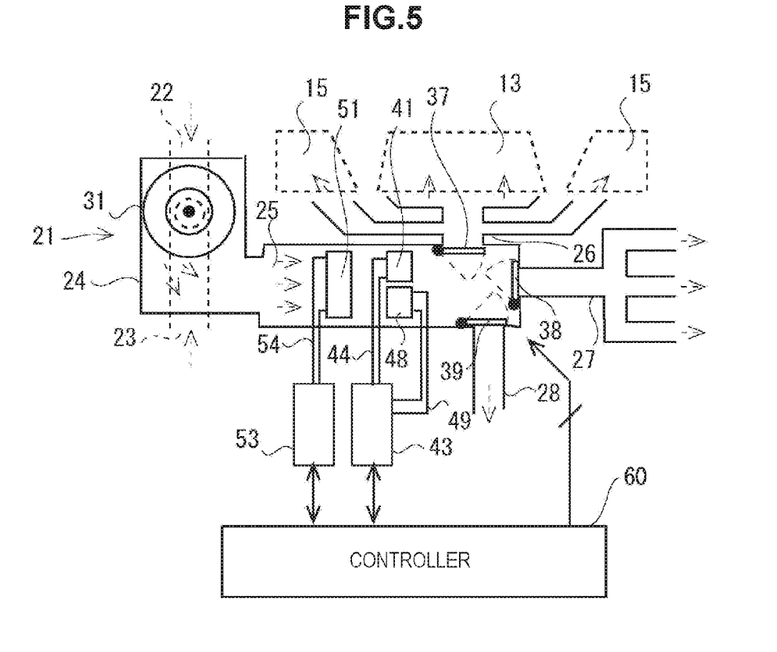
FIG. 5 is a schematic rough configuration diagram of an air-conditioning apparatus for a vehicle according to a third implementation of the present invention.

FIG. 5 is a schematic rough configuration diagram of the air-conditioning apparatus 20 for a vehicle according to a third implementation of the present invention.

The air-conditioning apparatus 20 for a vehicle of FIG. 5 includes the air-conditioning duct 21, the blower fan 31, a third heat exchanger 48, a third circulation path 49, the second heat exchanger 51, the second heat-insulating tank 53 that stores the second intermediate medium 52, the second circulation path 54, the first heat exchanger 41, the first heat-insulating tank 43 that stores the first intermediate medium 42, and the first circulation path 44.

The third heat exchanger 48 may be a similar structure to the first heat exchanger 41. The third heat exchanger 48 is located below the first heat exchanger 41 in the air supply path 25.

The third circulation path 49 connects the first heat-insulating tank 43 and the third heat exchanger 48.

Thereby, the first intermediate medium 42 can circulate between the first heat-insulating tank 43 and the third heat exchanger 48 through the third circulation path 49. The first intermediate medium 42 in the first heat-insulating tank 43 is supplied to the third heat exchanger 48 through the third circulation path 49. In the third heat exchanger 48, heat exchange is performed between the air in the air-conditioning duct 21 and the first intermediate medium 42. The air in the air-conditioning duct 21 is cooled or warmed by the first intermediate medium 42. The first intermediate medium 42 after heat exchange is returned to the first heat-insulating tank 43 through the third circulation path 49. After that, the first intermediate medium 42 is re-heated or re-cooled by the evaporator 32, the heater 34, and the electric heater 45.

Otherwise, the configuration of the air-conditioning apparatus 20 for a vehicle of FIG. 5 is the same as the air-conditioning apparatus 20 for a vehicle of FIG. 4, and a description thereof is omitted using the same reference numerals.

In the air-conditioning apparatus 20 for a vehicle thus configured, the controller 60 performs control for air-conditioning the passenger room 3.

The controller 60 controls the flow of air in the air-conditioning duct 21, controls the supply of the cool medium and the warm medium to the first heat-insulating tank 43, controls the electrical energization of the electric heater 45 in the first heat-insulating tank 43, and controls the supply of the first intermediate medium 42 from the first heat-insulating tank 43 to the first heat exchanger 41. Furthermore, the controller 60 controls the supply of the cool medium and the warm medium to the second heat-insulating tank 53, controls the electrical energization of the electric heater 45 in the second heat-insulating tank 53, and controls the supply of the second intermediate medium 52 from the second heat-insulating tank 53 to the second heat exchanger 51. Furthermore, the controller 60 controls the supply of the first intermediate medium 42 from the first heat-insulating tank 43 to the third heat exchanger 48.

When, for example, the temperature of the passenger room 3 is low, the controller 60 supplies the warm medium to the first heat-insulating tank 43 without putting the second heat-insulating tank 53 into operation. When the motive power source of the automobile 1 is in shutdown or is not warm, the electric heater 45 is electrically energized. Thereby, the first intermediate medium 42 in the first heat-insulating tank 43 is warmed to a temperature enough to set the interior of the passenger room 3 to a desired temperature. The controller 60 circulates the warmed first intermediate medium 42 between the first heat-insulating tank 43 and the first heat exchanger 41, and circulates the warmed first intermediate medium 42 between the first heat-insulating tank 43 and the third heat exchanger 48. In the first heat exchanger 41 and the third heat exchanger 48, heat exchange is performed between the warmed first intermediate medium 42 and the air in the passenger room 3; and the warmed air is blown out to the passenger room 3. Consequently, the passenger room 3 is warmed.

The operation is similar when cooling or dehumidification is performed.

In the implementation, the first heat exchanger 41 and the third heat exchanger 48 are vertically juxtaposed in the air supply path 25 of the air-conditioning duct 21. Hence, the controller 60 may make a difference between the flow rate of the first intermediate medium 42 in the first heat exchanger 41 and the flow rate of the first intermediate medium 42 in the third heat exchanger 48, and can thereby provide a temperature difference for the air blown out from the air-conditioning duct 21. For example, the first intermediate medium 42 may be passed in a larger amount through the third heat exchanger 48 than through the first heat exchanger 41; thereby, the temperature of the air that has passed through the third heat exchanger 48 is made higher than the temperature of the air that has passed through the first heat exchanger 41. The temperature of the air coming into contact with the face, etc. of the passenger can be decreased and an uncomfortable feeling can be suppressed, without reducing the amount of heat supplied to the passenger room 3, for example.

[Fourth Implementation]

Figure 6:
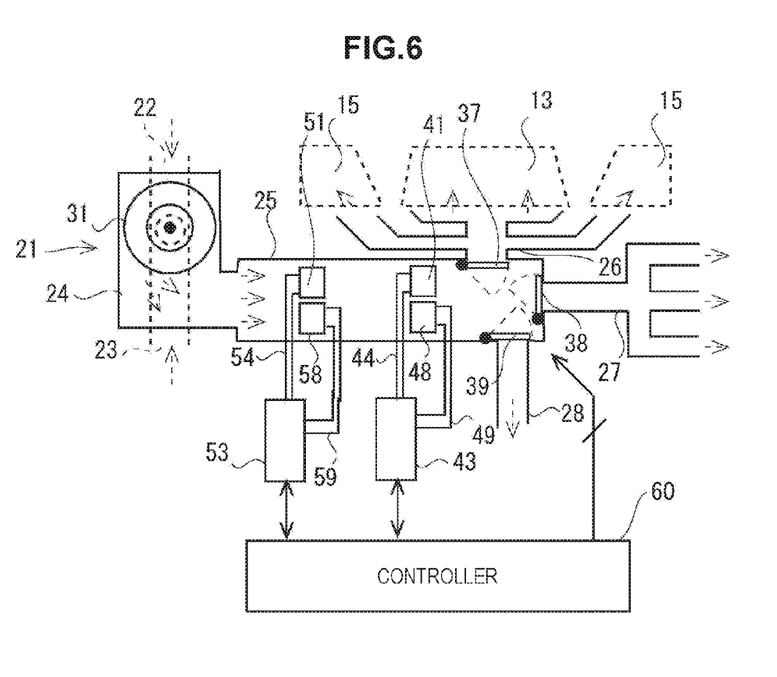
FIG. 6 is a schematic rough configuration diagram of an air-conditioning apparatus for a vehicle according to a fourth implementation of the present invention.

FIG. 6 is a schematic rough configuration diagram of the air-conditioning apparatus 20 for a vehicle according to a fourth implementation of the present invention.

The air-conditioning apparatus 20 for a vehicle of FIG. 6 includes the air-conditioning duct 21, the blower fan 31, a fourth heat exchanger 58, a fourth circulation path 59, the third heat exchanger 48, the third circulation path 49, the second heat exchanger 51, the second heat-insulating tank 53 that stores the second intermediate medium 52, the second circulation path 54, the first heat exchanger 41, the first heat-insulating tank 43 that stores the first intermediate medium 42, and the first circulation path 44.

The fourth heat exchanger 58 may be a similar structure to the second heat exchanger 51. The fourth heat exchanger 58 is located below the second heat exchanger 51 in the air supply path 25.

The fourth circulation path 59 connects the second heat-insulating tank 53 and the fourth heat exchanger 58.

Thereby, the second intermediate medium 52 can circulate between the second heat-insulating tank 53 and the fourth heat exchanger 58 through the fourth circulation path 59. The second intermediate medium 52 in the second heat-insulating tank 53 is supplied to the fourth heat exchanger 58 through the fourth circulation path 59. In the fourth heat exchanger 58, heat exchange is performed between the air in the air-conditioning duct 21 and the second intermediate medium 52. The air in the air-conditioning duct 21 is cooled or warmed by the second intermediate medium 52. The second intermediate medium 52 after heat exchange is returned to the second heat-insulating tank 53 through the fourth circulation path 59. After that, the second intermediate medium 52 is re-heated or re-cooled by the evaporator 32, the heater 34, and the electric heater 45.

Otherwise, the configuration of the air-conditioning apparatus 20 for a vehicle of FIG. 6 is the same as the air-conditioning apparatus 20 for a vehicle of FIG. 5, and a description thereof is omitted using the same reference numerals.

In the air-conditioning apparatus 20 for a vehicle thus configured, the controller 60 performs control for air-conditioning the passenger room 3.

The controller 60 controls the flow of air in the air-conditioning duct 21, controls the supply of the cool medium and the warm medium to the first heat-insulating tank 43, controls the electrical energization of the electric heater 45 in the first heat-insulating tank 43, and controls the supply of the first intermediate medium 42 from the first heat-insulating tank 43 to the first heat exchanger 41 and the third heat exchanger 48 individually. Furthermore, the controller 60 controls the supply of the cool medium and the warm medium to the second heat-insulating tank 53, controls the electrical energization of the electric heater 45 in the second heat-insulating tank 53, and controls the supply of the second intermediate medium 52 from the second heat-insulating tank 53 to the second heat exchanger 51 and the fourth heat exchanger 58 individually.

When, for example, dehumidifying the passenger room 3, the controller 60 puts the second heat-insulating tank 53 into operation while controlling the first intermediate medium 42 of the first heat-insulating tank 43 to a temperature enough to set the interior of the passenger room 3 to a desired temperature. The second intermediate medium 52 of the second heat-insulating tank 53 is controlled by the evaporator 32 of the second heat-insulating tank 53 to a temperature at which the second intermediate medium 52 does not freeze, approximately 0 degrees. When the second intermediate medium 52 has become too cool, the heater 34 or the electric heater 45 is put into operation in the second heat-insulating tank 53. The controller 60 circulates the cooled second intermediate medium 52 between the second heat-insulating tank 53 and the second heat exchanger 51, and separately from this, circulates the cooled second intermediate medium 52 with the fourth heat exchanger 58. In the second heat exchanger 51 and the fourth heat exchanger 58, heat exchange is performed between the cooled second intermediate medium 52 and the air in the passenger room 3; and the air is dehumidified. The dehumidified air is warmed to a desired temperature by the first heat exchanger 41 and the third heat exchanger 48, and is then blown out to the passenger room 3. Consequently, the passenger room 3 is dehumidified.

The controller 60 passes the second intermediate medium 52 in a larger amount through the second heat exchanger 51 than through the fourth heat exchanger 58 that is juxtaposed below the second heat exchanger 51 in the air supply path 25 of the air-conditioning duct 21, for example. Thereby, the humidity of the air that has passed through the second heat exchanger 51 is made lower than the humidity of the air that has passed through the fourth heat exchanger 58.

[Fifth Implementation]

Figure 7:
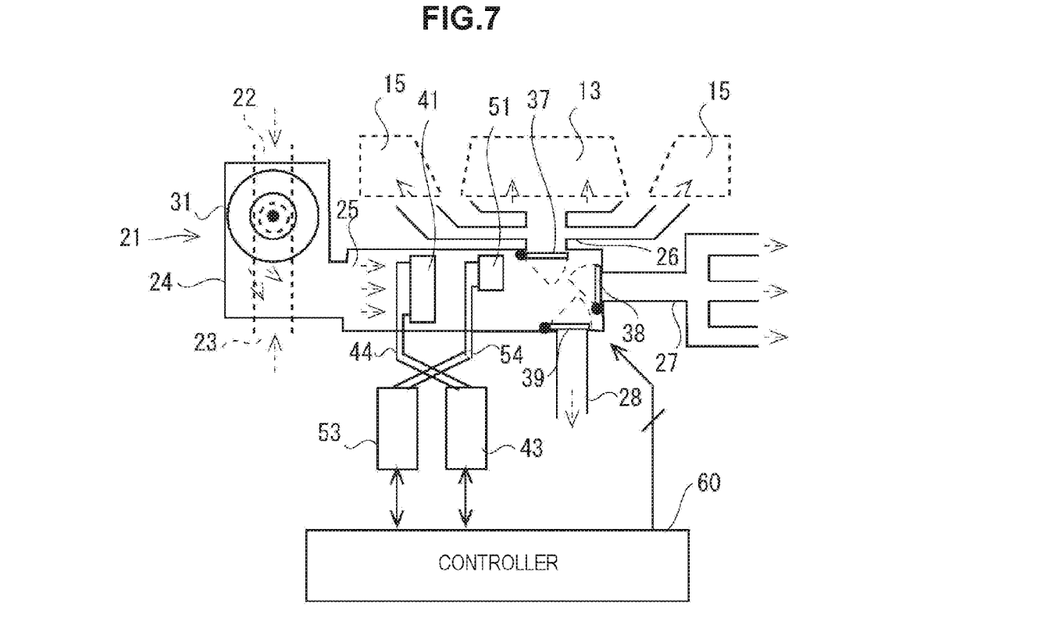
FIG. 7 is a schematic rough configuration diagram of an air-conditioning apparatus for a vehicle according to a fifth implementation of the present invention.

FIG. 7 is a schematic rough configuration diagram of the air-conditioning apparatus 20 for a vehicle according to a fifth implementation of the present invention.

The air-conditioning apparatus 20 for a vehicle of FIG. 7 includes the air-conditioning duct 21, the blower fan 31, the first heat exchanger 41, the first heat-insulating tank 43 that stores the first intermediate medium 42, the first circulation path 44, the second heat exchanger 51, the second heat-insulating tank 53 that stores the second intermediate medium 52, the second circulation path 54, and the controller 60.

The first heat exchanger 41 and the second heat exchanger 51 are juxtaposed along the flow of air in the air supply path 25 of the air-conditioning duct 21.

The first heat exchanger 41 is disposed upstream side of the second heat exchanger 51.

The second heat exchanger 51 is provided in an upper portion of the air supply path 25.

Otherwise, the configuration of the air-conditioning apparatus 20 for a vehicle of FIG. 7 is the same as the air-conditioning apparatus 20 for a vehicle of FIG. 4, and a description thereof is omitted using the same reference numerals.

The controller 60 controls the flow of air in the air-conditioning duct 21, controls the supply of the cool medium and the warm medium to the first heat-insulating tank 43, controls the electrical energization of the electric heater 45 in the first heat-insulating tank 43, and controls the supply of the first intermediate medium 42 from the first heat-insulating tank 43 to the first heat exchanger 41. Furthermore, the controller 60 controls the supply of the cool medium and the warm medium to the second heat-insulating tank 53, controls the electrical energization of the electric heater 45 in the second heat-insulating tank 53, and controls the supply of the second intermediate medium 52 from the second heat-insulating tank 53 to the second heat exchanger 51.

When, for example, the temperature of the passenger room 3 is low, the controller 60 supplies the warm medium to the first heat-insulating tank 43 without putting the second heat-insulating tank 53 into operation. When the motive power source of the automobile 1 is in shutdown or is not warm, the electric heater 45 is electrically energized. Thereby, the first intermediate medium 42 in the first heat-insulating tank 43 is warmed to a temperature enough to set the interior of the passenger room 3 to a desired temperature. The controller 60 circulates the warmed first intermediate medium 42 between the first heat-insulating tank 43 and the first heat exchanger 41. In the first heat exchanger 41, heat exchange is performed between the warmed first intermediate medium 42 and the air in the passenger room 3; and the warmed air is blown out to the passenger room 3. Consequently, the passenger room 3 is warmed.

Other than this, when, for example, the temperature of the passenger room 3 is high, the controller 60 supplies the cool medium to the first heat-insulating tank 43 without putting the second heat-insulating tank 53 into operation. Thereby, the first intermediate medium 42 in the first heat-insulating tank 43 is cooled to a temperature enough to set the interior of the passenger room 3 to a desired temperature. The controller 60 circulates the cooled first intermediate medium 42 between the first heat-insulating tank 43 and the first heat exchanger 41. In the first heat exchanger 41, heat exchange is performed between the cooled first intermediate medium 42 and the air in the passenger room 3; and the cooled air is blown out to the passenger room 3. Consequently, the passenger room 3 is cooled.

Other than these, when, for example, dehumidifying the passenger room 3, the controller 60 puts the second heat-insulating tank 53 into operation while controlling the first intermediate medium 42 of the first heat-insulating tank 43 to a temperature enough to set the interior of the passenger room 3 to a desired temperature. The second intermediate medium 52 of the second heat-insulating tank 53 is controlled by the evaporator 32 of the second heat-insulating tank 53 to a temperature lower than the target temperature of the passenger room 3. When the second intermediate medium 52 has become too cool, the heater 34 or the electric heater 45 is put into operation in the second heat-insulating tank 53. The controller 60 circulates the cooled second intermediate medium 52 between the second heat-insulating tank 53 and the second heat exchanger 51. In the second heat exchanger 51, heat exchange is performed between the cooled second intermediate medium 52 and the air in the passenger room 3; and the air is dehumidified. The air flowing through the upper portion of the air supply path 25 is warmed to a desired temperature by the first heat exchanger 41, is then cooled and dehumidified by the second heat exchanger 51, and is blown out to the passenger room 3. Consequently, dehumidified air is supplied to the upper portion of the passenger room 3.

[Sixth Implementation]

Figure 8:
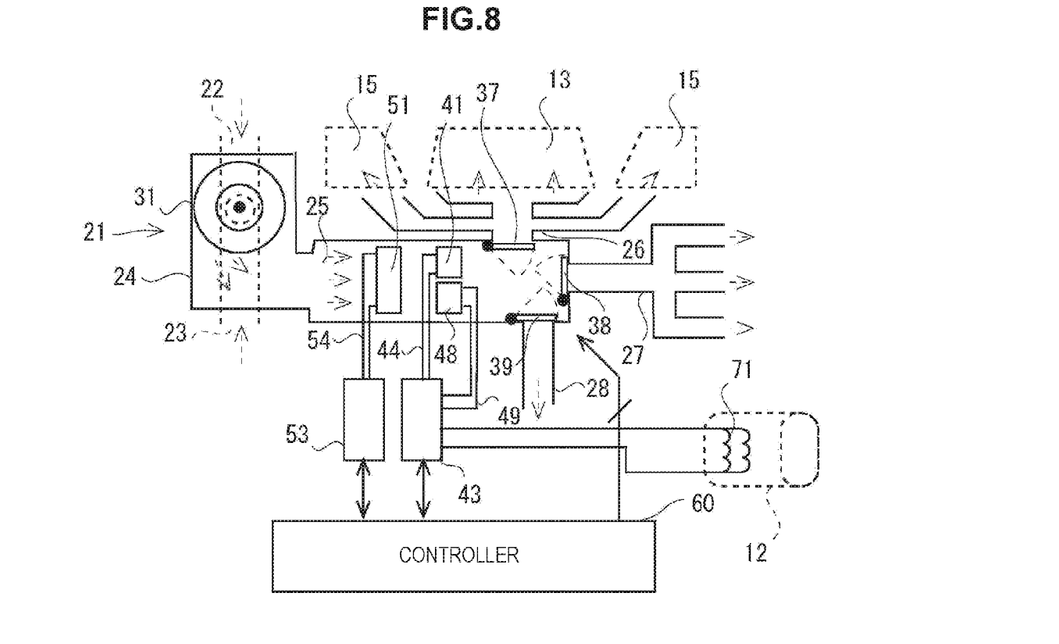
FIG. 8 is a schematic rough configuration diagram of an air-conditioning apparatus for a vehicle according to a sixth implementation of the present invention.

FIG. 8 is a schematic rough configuration diagram of the air-conditioning apparatus 20 for a vehicle according to a sixth implementation of the present invention.

The air-conditioning apparatus 20 for a vehicle of FIG. 8 includes the air-conditioning duct 21, the blower fan 31, the first heat exchanger 41, the first heat-insulating tank 43 that stores the first intermediate medium 42, the first circulation path 44, an interior circulation path 71, the second heat exchanger 51, the second heat-insulating tank 53 that stores the second intermediate medium 52, the second circulation path 54, and the controller 60.

The interior circulation path 71 is a circulation path that allows the first intermediate medium 42 to circulate in the passenger room 3. The interior circulation path 71 is provided between the first heat-insulating tank 43 and the seat 12 of the passenger room 3, for example. The seat 12 in the passenger room 3 is directly warmed by the first intermediate medium 42 that is warmed to a temperature enough to set the interior of the passenger room 3 to a desired temperature.

Other than this, the interior circulation path 71 may be embedded in the side panel, the roof panel, etc., which partition the passenger room 3, for example.

Otherwise, the configuration of the air-conditioning apparatus 20 for a vehicle of FIG. 8 is the same as the air-conditioning apparatus 20 for a vehicle of FIG. 4, and a description thereof is omitted using the same reference numerals.

In the implementation, the equipment of the passenger room 3 can be directly warmed by the interior circulation path 71. Conventionally, the equipment of the passenger room 3 has been unable to be directly warmed unless a dedicated heater or the like is added separately from the common air-conditioning apparatus 100 for a vehicle; but the equipment of the passenger room 3 can be directly warmed by the air-conditioning apparatus 20 for a vehicle.

The above implementations are examples of the preferred implementation of the present invention, but the present invention is not limited thereto, and various modifications or alterations are possible without departing from the spirit of the invention.

For example, in the implementations described above, the evaporator 32 of the first heat-insulating tank 43 is supplied with the cool medium from the cool medium circulation apparatus 33 that works by being driven by the motive power source of the automobile 1. The heater 34 is supplied with the warm medium from the warm medium circulation apparatus 35 that works by being driven by the motive power source of the automobile 1.

Other than these, for example, the cool medium circulation apparatus 33 or the warm medium circulation apparatus 35 may be driven by another engine or a battery of the automobile 1.

The implementations described above are examples in which the present invention is applied to the automobile 1.

Other than them, for example, the present invention may be applied to vehicles other than automobiles, such as trains.

Although the preferred implementations of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. An air-conditioning apparatus for a vehicle, comprising:
    an air-conditioning duct that includes an air supply path, wherein the air supply path is configured to pass air to be supplied to an interior of the vehicle;
    a first tank configured to store a first intermediate medium, and to which a first cool medium and a first warm medium to adjust a temperature of the first intermediate medium are supplied;
    a first heat exchanger that is provided in the air-conditioning duct and through which the first intermediate medium circulates from the first tank;
    a second heat exchanger that is juxtaposed below the first heat exchanger in the air supply path of the air-conditioning duct and through which the first intermediate medium circulates from the first tank
    a second tank configured to store a second intermediate medium, and to which a second cool medium and a second warm medium to adjust a temperature of the second intermediate medium are supplied;
    a third heat exchanger that is provided, in the air-conditioning duct, upstream of both the first heat exchanger and the second heat exchanger, and wherein the second intermediate medium circulates from the second tank through the third heat exchanger; and
    a controller configured to:
        control the first intermediate medium to set a temperature of the interior of the vehicle to a desired temperature;
        control the second intermediate medium to a dehumidification temperature; and
        pass the first intermediate medium in a larger amount through the second heat exchanger than through the first heat exchanger.

2. The air-conditioning apparatus for a vehicle according to claim 1, wherein the air-conditioning duct includes:
    an upper blowout path configured to blow out the air toward an upper portion or a glass surface of the interior of the vehicle, and
    a lower blowout path that is provided below the upper blowout path and is configured to blow out the air toward a lower portion of the interior of the vehicle,
    the first heat exchanger is provided in the air supply path, where the first intermediate medium flows from bottom toward top, and
    the second heat exchanger is provided in the air supply path, where the second intermediate medium flows from top toward bottom.

3. The air-conditioning apparatus for a vehicle according to claim 1, further comprising:
    an interior circulation path configured to allow the first intermediate medium to circulate between the first tank and the interior of the vehicle.

4. The air-conditioning apparatus for a vehicle according to claim 2, further comprising:
    an interior circulation path configured to allow the first intermediate medium to circulate between the first tank and the interior of the vehicle.

* * * * *